UNITED STATES PATENT OFFICE 2,518,245

PROCESS FOR PREPARING COPOLYMERS FROM ALKYLENE GLYCOLS AND DI(HYDROXYALKYL)SULFIDES

Rupert C. Morris, Berkeley, and John L. Van Winkle, San Lorenzo, Calif., assignors to Shell Development Company, San Francisco, Calif., a corporation of Delaware No Drawing. Application August 24, 1946, Serial No. 692,924

13 Claims. (Cl. 260—609)

This invention relates to lubricating compositions and more particularly it relates to lubricants comprising certain copolymers having both ether linkages and thioether linkages as well as to the novel copolymers.

It is known that lubricants may be prepared containing a major amount of polymeric alkylene glycols having hydroxyl radicals on adjacent carbon atoms. Such glycols polymerize to form linear structures having the essential unit configuration

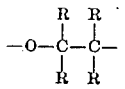

wherein the R's are hydrogens or organic radicals, such as hydrocarbon radicals. Ethylene glycol forms such polymers, and similar structure are prepared by polymerization of alkylene oxides, such as ethylene oxide, propylene oxide, etc. Polymers useful for lubricating purposes may be prepared by polymerizing other polymethylene glycols as well.

The polymers having the unit

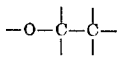

while useful for certain lubricating purposes, are limited by inherent shortcomings. Lubricants comprising polymers of propylene oxide, for example, are thermally unstable at temperatures ordinarily encountered during engine lubrication, volatilizing abruptly above about 180° C. Moreover, they are highly susceptible to oxidation and show a relatively poor response to the ordinary anti-oxidants. The lubricants comprising polymers having more than two carbon atoms separating ether linkages are more stable, both thermally and towards oxidation. Their more general utility in lubricating compositions is limited in many cases by the relatively high freezing points thereof, some of the polymers being brittle waxes at room temperature, others solidifying at about 0° C., requiring dissolution in a solvent medium for use in lubrication.

It is an object of this invention to provide new non-petroleum base lubricants having high thermal stability, resistance to oxidation and response to oxidation inhibitors. It is another object of this invention to provide non-hydrocarbon lubricants for use as anti-corrosion composition bases, extreme pressure lubricating bases, etc. It is yet another object of this invention to provide synthetic lubricants having low pour points and freezing points. Other objects will be obvious from the following description of the present invention.

Now in accordance with this invention it has been found that copolymers having units of the general configuration:

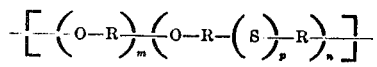

wherein $m$, $n$ and $p$ are integers and the R's are organic radicals (preferably hydrocarbon radicals) are excellent for lubrication purposes, having unexpected advantages over polymers discussed hereinbefore. In accordance with this invention, these copolymers may be produced by copolymerizing glycols having the general configuration

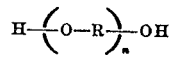

wherein $n$ is an integer and R is an organic radical, with dihydroxythioethers or dihydroxy polysulfides having the general configuration

wherein $p$ is an integer and the R's are organic radicals.

The hydroxythioethers and polysulfides from which the present polymers may be prepared are represented by the general formula

wherein the R's are organic radicals and $p$ is an integer. When $p$ is 1, the general formula is that of a dihydroxythioether, whereas when $p$ is more than 1 the general formula is that of a dihydroxy polysulfide. Preferably $p$ is an integer from 1 to 6, and the polymers of greatest utility are those in which $p$ is an integer between 1 and 3, inclusive.

The dihydroxythioethers having the general formula

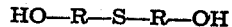

have organic radicals R which are either similar or dissimilar. Preferably they are similar hydrocarbon radicals. The aliphatic hydrocarbon radicals, and especially the saturated aliphatic hydrocarbon radicals form copolymers with the subject alkylene glycols having excellent stability against oxidation.

When the R's are saturated aliphatic hydrocarbon radicals, they may be of primary, secondary or tertiary character with relation to the thioether sulfur atom, dependent upon their method of formation. For example, the primary dihydroxythioethers have the general formula

HO—R—CH$_2$—S—CH$_2$—R—OH wherein the R's are saturated aliphatic radicals. Thioethers of this configuration are conveniently prepared by the "abnormal" condensation of unsaturated alcohols with hydrogen sulfide. Thus, when allyl alcohol and hydrogen sulfide are condensed in the presence of ultra-violet light at moderate temperatures, one of the products is bis (gamma-hydroxypropyl) sulfide.

A typical preparation of this character is that of the condensation of hydrogen sulfide with allyl alcohol, as follows:

Five hundred c. c. allyl alcohol and 124 g. hydrogen sulfide were mixed in a quartz tube and irradiated near a 250 watt mercury arc lamp for two hours. During the first hour the pressure rose from 140 lb. per sq. in. to 190 lb. per sq. in., after which it fell to 160 lb. per sq. in. In this time the temperature increased from 15° C. to 100° C., due in part to the exothermic character of the reaction, but mainly due to the heat from the mercury arc lamp. The product was subjected to fractional distillation, that part remaining in the still above 134° C. at 0.3 cm. Hg pressure being bis (gamma-hydroxypropyl) sulfide.

Suitable alcohols for the preparation of primary dihydroxythioethers include, isopropenyl alcohol, allyl alcohol, crotenyl alcohol, methallyl alcohol, and their homologs, analogs and substitution products. Another thioether of this type is bis (beta-hydroxyethyl) sulfide.

Thioethers having hydroxyl groups on other than terminal carbons, include bis (alpha-hydroxyethyl) sulfide, and bis (alpha- and beta-hydroxypropyl) sulfide.

Mixed hydroxythioethers are useful in forming the lubricants of the present invention. These include beta-hydroxyethyl-gamma-hydroxypropyl sulfide, hydroxymethyl - beta - hydroxyethyl sulfide, alpha-hydroxyethyl-alpha-hydroxypropyl sulfide, as well as their homologs, analogs and derivatives. Higher thioethers of this class may be prepared having hydroxybutyl, hydroxyamyl, hydroxyhexyl, etc. groups.

Those hydroxythioethers having the general formula

HO—R—CH$_2$—S—CH$_2$—R—OH in which the R's are similar saturated aliphatic radicals having from 1 to 6 carbon atoms are preferred in preparing the copolymers used in the lubricants of the present invention.

When the monomeric sulfur compound is a polysulfide having the general formula

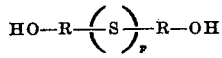

it is preferred that $p$ be a number between 2 and 6, and that the R's be similar or dissimilar saturated aliphatic hydrocarbons. The latter may have functional groups attached thereto, such as carboxyl, carbonyl, hydroxyl, etc. Preferably, the R's are similar saturated aliphatic radicals having from 2 to 20 carbon atoms. While these latter may be of primary, secondary or tertiary nature, with respect to the polysulfide group, those forming polymers of the greatest utility have the general formula

wherein the R's are similar saturated aliphatic hydrocarbons having 1 to 19 carbons (preferably 1 to 6) and $p$ is an integer from 2 to 6 (preferably 2 or 3). Such polysulfides may be prepared, for example, by the condensation of two molecules of a mercaptoalkyl alcohol.

Polysulfides having the preferred structure include bis (gamma-hydroxypropyl )disulfide, bis (beta-hydroxyethyl) disulfide, bis (hydroxymethyl) disulfide, hydroxymethyl-gamma-hydroxypropyl disulfide, hydroxymethyl-beta-hydroxyethyl disulfide, beta-hydroxyethyl-gamma-hydroxypropyl disulfide, etc., and their homologs and analogs.

The glycols with which the hydroxythioethers and polysulfides are copolymerized according to the present invention have the general formula

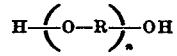

wherein R is an organic radical and $n$ is an integer. While it is preferred that the organic radical be a hydrocarbon, it may also contain functional groups or elements such as carboxyl, carbonyl, or hydroxyl groups, or sulfur, oxygen, nitrogen, selenium, etc. atoms.

When R is a hydrocarbon radical, the glycollic hydroxyl groups may be attached to adjacent carbon atoms or may be separated by more than two carbon atoms. The former type includes glycols derived from ethylene glycol, having the general formula

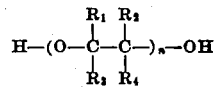

wherein $n$ is an integer and $R_1$ through $R_4$ are either hydrogens or organic radicals, preferably saturated aliphatic hydrocarbon radicals. It is preferred that the ethylene glycol derivative be one in which $n$ is an integer less than 6 and at least two of the R's are hydrogens. When $n$ is greater than 1, the glycol actually is a lower polymer of a monomeric glycol.

Monomeric glycols, having the above general formula include ethanediol-1,2 (ethylene glycol), propanediol-1,2; butanediol-1,2; butanediol-2,3; pentanediol-1,2; pentanediol-2,3; hexanediol-1,2; hexanediol-2,3; hexanediol-3,4; heptanediol-1,2; heptanediol-2,3; heptanediol-3,4; 1,1-dimethylethanediol - 1,2; 1,1 - diethylethanediol - 1,2; 1,1-dipropylethanediol-1,2; 1,1-dimethylpropanediol-1,2; 1,1-diethylpropanediol-1,2; 1,1-dipropylpropanediol-1,2; 1,1-dimethylbutanediol-1,2; 1,1 - diethylbutanediol - 1,2; 2,2 - dimethyl - butanediol-2,3; 2,3-diethylbutanediol-2,3; 1,2-dimethylbutanediol-1,2; 2,3-dimethylbutanediol-1,2; 1,2-dimethylbutanediol-1,2; 1,2-dimethylbutanediol-2,3; 1,3-dimethylbutanediol-2,3; 2,3-dimethylbutanediol - 2,3; 1,2,3,4 - tetramethyl - butanediol-1,2; 1,2,3,4-tetraethylbutanediol-2,3; and their polymerizable homologs, analogs and derivatives.

When $n$ in the above general formula is more than 1, the glycols include diethylene glycol, triethylene glycol, tetraethylene glycol, dipropylene glycol, tripropylene glycol, dibutylene glycol, tributylene glycol, etc.

Glycols having the above structures fall within the general formula

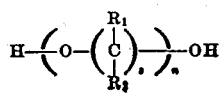

when $s$ is 2, $n$ is an integer and the R's are hydrogens or organic radicals. Other glycols result when $s$ is an integer greater than 2, preferably from 3 to 20, inclusive and still more preferably from 3 to 9. Glycols having these structures include those based on trimethylene glycol, hexamethylene glycol, heptamethylene glycol, octamethylene glycol, decamethylene glycol, dodecamethylene glycol, etc.

The monomeric trimethylene glycols having the above general formula are derived from trimethylene glycol. Preferably, $R_1$ and $R_2$ are hydrogens. In such case, the polymers are formed from trimethylene glycol itself. If any of the R's are not hydrogens, they may be organic radicals such as alkyl, aralkyl, aryl, etc. Preferably, if they are not hydrogens, they are aliphatic radicals, especially saturated lower aliphatic radicals, but also may be groups which contain olefinic or acetylenic links. Typical of the alkyl substituted trimethylene glycols are the methylated trimethylene glycols, including 1-methylpropanediol-1,3; 2-methylpropanediol-1,3; 1,1-dimethylpropanediol-1,3; 1,2 dimethylpropanediol - 1,3; 1,3 - dimethylpropanediol - 1,3; 2,2 - dimethylpropanediol - 1,3; 1,1,2 - trimethyl - propanediol-1,3; 1,1,3-trimethylpropanediol-1,3; 1,2,2-trimethylpropanediol-1,3; 1,2,3-trimethylpropanediol-1,3; 1,1,2,2-tetramethylpropanediol-1,3; 1,1,3,3-tetramethylpropanediol-1,3; 1,2,3,3-tetramethylpropanediol - 1,3; 1,1,2,2,3 - penta - methylpropanediol-1,3; 1,1,2,3,3 - pentamethylpropanediol-1,3; and hexamethylpropanediol-1,3.

In place of the methyl groups other alkyl groups may be utilized, such as ethyl, propyl, butyl, amyl, hexyl, heptyl, octyl, nonyl, decyl, etc., radicals, as well as their isomers. Preferably, when alkyl groups are the substituents $R_1$ and/or $R_2$, they have from 1 to 10 carbon atoms, and still more preferably from 1 to 5. It will be understood that $R_1$ and $R_2$ may be similar or dissimilar groups. Thus, when expanding the general trimethylene glycol formula given hereinbefore to its indicated number of carbon atoms, it then becomes

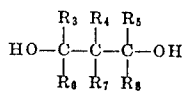

wherein $R_3$ through $R_8$ are either hydrogen atoms or similar or dissimilar organic radicals. The derivatives of trimethylene glycol, other than trimethylene glycol itself, which give the most satisfactory polymers for general use have at least 4 hydrogen substituents and less than 3 hydrocarbon substituents. Thus, 2-methylpropanediol-1,3 and 2,2-dimethylpropanediol-1,3 form excellent polymeric lubricants when treated according to the method of the present invention.

Other lower alkyl substituted trimethylene glycols which polymerize readily are 1-methyl-2-ethylpropanediol-1,3; 2 - methyl-2-ethylpropanediol-1,3; 1-methyl - 3 - ethylpropanediol - 1,3; 2-methyl-2-propylpropanediol-1,3; 1-methyl-2-isopropylpropanediol-1,3; 2 - methyl - 2-butylpropanediol-1,3; 2 - methyl-3-butylpropanediol-1,3; and the homologs, analogs and derivatives of the same.

Cycloaliphatic radicals may be one or more of the substituents represented by $R_3$ to $R_8$ in the above general formula. Thus, $R_3$ through $R_8$ may be such radicals as cyclohexyl, methylcyclohexyl, dimethylcyclohexyl, ethylcyclohexyl, etc. However, open-chain saturated aliphatic hydrocarbon substituents give polymeric lubricants having preferred properties.

The polymers have modified properties if the trimethylene glycol derivative contains other active groups, such as additional hydroxyls or carbonyls, alkoxyls, carboxyls, halogens, sulfur, selenium, tellurium, phosphorus, nitrogen, etc.

When the glycols have more than 5 carbon atoms separating the glycollic hydroxyls, $s$ in the general formula given above is a number greater than 5. Monomeric, unsubstituted polymethylene glycol falling within the above formula include hexanediol-1,6; heptanediol-1-7; octanediol-1,8; nonanediol-1,9; decanediol-1,10; dodecanediol-1,12; and polymerizable homologs, analogs and derivatives of the same.

The above glycols are those in which all of the R substituents attached to the $y$ carbons are hydrogens. When R's other than hydrogens are used, they may be hydrocarbon radicals, such as aliphatic, aromatic, or alicyclic hydrocarbon radicals, or radicals containing non-hydrocarbon members, such as hydroxyl, carboxyl, or carbonyl groups, or sulfur, selenium, tellurium, phosphorus or nitrogen atoms. Preferably, however, any organic radicals attached to the polymethylene glycol are hydrocarbon radicals. Of these, the aliphatic hydrocarbons are preferred, and the saturated lower aliphatic radicals give the most stable polymeric lubricants. Hence, the preferred R's, other than hydrogen, are the lower alkyls, such as methyl, ethyl, propyl, iso-propyl, butyl, sec-butyl, tert-butyl, amyl, iso-amyl, hexyl, etc. groups. When R's other than hydrogen are present, it is preferred that the monomeric glycol contain a preponderance of hydrogen substituent R's. The most reactive glycols are those in which less than 4 R's are other than hydrogen, and optimum lubricating properties are possessed by those having 2 or less R's which are organic radicals.

Glycols which fall within the above classification include heptanediol-1,6; octanediol-1,6; nonanediol-1,6; dodecanediol-1,6; decanediol-1,6; octanediol-1,7; nonanediol-1,7; decanediol-1,7; dodecanediol-1,7; nonanediol-1,8; decanediol-1,8; dodecanediol-1,8; decanediol-1,9; dodecanediol-1,9; dodecanediol-1,10; octanediol-2,7; nonanediol-2,7; decanediol-2,7; dodecanediol-2,7; nonanediol-2,8; decanediol-2,8; dodecanediol-2,8; decanediol-2,9; dodecanediol-2,9; 2,3- dimethylhexanediol-1,6; 2,4-dimethylhexanediol-1,6; 2,5-dimethylhexanediol-1,6; 4,4-dimethylhexanediol-1,6; 5,5 - dimethylhexanediol - 1,6; 2 - methyl-3-ethylheptanediol-1,7; 2-ethyl-3-methylheptanediol-1,7; 3,3-diethylheptanediol-1,7; 3,4- diisopropyloctanediol-1,8; etc. and their polymerizable homologs, analogs and derivatives.

The process of preparing the lubricants of the present invention comprises the essential step of heating an alkylene glycol with the hydroxythioethers or polysulfides defined hereinbefore in the presence of certain catalysts. Since the mechanism of the polymerization is one involving dehydration as an intermediate step, dehydration catalysts are employed. These include iodine, inorganic acids such as halogen acids, sulfuric acid and phosphoric acid and organic acids, particularly sulfonic acid. Examples of dehydration catalysts are hydrogen chloride, hydrogen bromide, hydrogen iodide, aromatic sulfonic acids such as para-toluenesulfonic acid, benzenesulfonic acid, acid-acting salts such as alkali metal acid sulfates or phosphates, including sodium bisulfate, aluminum sulfate, potassium acid phosphate, etc.

The catalysts may be employed in solid, liquid or gaseous form, or may be present as an aqueous or organic solution. Hydrogen iodide, for example, is conveniently utilized in the present process as a concentrated aqueous solution, initially containing about 50% water. Others, such as the sulfonic acids, may be added as solids, liquids, or in either organic or aqueous solutions.

Dependent upon the nature of the monomer, the identity of the catalyst, the temperature of the polymerization reaction and the polymerization rate desired, the catalyst may be used in ratios with the monomer varying from about 1:500 to 1:10. Preferably, however, the ratio of catalyst is confined to the range from about 1:200 to 1:25, but a ratio of 1:100 gives satisfactory results in most circumstances.

The polymerization reaction may take place in either liquid, solution, emulsion or gaseous phases. Hence it is possible, and frequently even desirable, to use either liquid or gaseous diluents especially if active catalysts such as boron trifluoride or aluminum chloride are present. Liquid diluents may perform several functions by their presence, acting as solvents for the monomer and/or the polymer, as solvents for the catalyst, as azeotropic constituents for carrying off water formed during the polymerization, as diluents for the control of polymerization rate, or, by their boiling points, as controls for the temperature of the reaction, as one phase of an emulsified reaction mixture, etc. Gaseous diluents are used primarily when the polymerization is carried out in gaseous phase, but also may be injected to carry off the water formed during polymerization, or as coolants, etc.

Both gaseous and liquid diluents are preferably substantially inert toward the other components of the reaction mixture in the temperature range encountered prior to, during and after reaction. The most satisfactory diluents are hydrocarbons of either aromatic or aliphatic character, but preferably are saturated aliphatic hydrocarbons. When the diluent is to be used in an aqueous phase polymerization, it is preferably chosen from the group of hydrocarbons boiling between about 125° C. to about 300° C., especially if it is to be used in azeotropic distillation of water during polymerization. Hydrocarbons which serve as suitable diluents include the dihydronaphthalenes; cycloheptane, the decanes, including 2-methylnonane and 2,6-dimethyloctane; the octanes, including 2,2,3-trimethylpentane and 2-methyl-3-ethylpentane; the nonanes, such as 2-methyloctane, 2,4-dimethylheptane, 4-ethylheptane, the dodecanes such as dihexyl or 2,4,5,7-tetramethyl octane, etc.

When the polymerization is carried out in gaseous phase, the diluent may be a lower hydrocarbon such as methane, ethane, propane, butane, etc. which acts as a regulator or diluent for the reaction, but which can be stripped from the product with facility, subsequent to the polymerization.

The proportion of diluent is not a critical factor in carrying out the process of the present invention. However, it is a preferred practice to keep the reaction mixture as concentrated as possible, consistent with maintaining homogeneity, rate of polymerization etc. Ordinarily, when a diluent is used for a liquid phase polymerization the initial proportion of diluent to monomers is from about 1:1 to about 20:1, but preferably is initially from about 2:1 to about 5:1. When the temperature of the reaction is substantially below the boiling point of the diluent, this ratio will remain unchanged throughout the reaction. If, however, the conditions are such that water formed during polymerization distills azeotropically with part of the diluent the portion of the latter passing over in the azeotrope may be replaced in or near the polymerization zone, so as to maintain a substantially constant diluent:glycol ratio.

Other ingredients may be included in the polymerization mixture, or may be added from time to time during the polymerization. For example, the polymerization may be carried out in a closed system, such as an autoclave. In such a case, the water formed during the polymerization may be effectively removed by the presence of dehydrating agents which will combine with or absorb the water as it is formed. Inert gases such as nitrogen may be added to protect the hot polymerization mass from oxidation. Reactants, such as alcohols, may be present for the purpose of converting the hydroxyl radicals normally present on one or both ends of the polymer chains to other functional groups, as more particularly set forth hereinafter.

The temperature of polymerization may vary within a relatively wide range; but, unless the reaction mixture is substantially above about 150° C. only a negligible amount of polymerization occurs, at least within a reasonable reaction period. If the reaction temperature is substantially above about 300° C., decomposition of the monomeric glycols and of the polymers takes place to such an extent that undue losses occur and the product requires extensive purification. The preferred polymerization temperature range is from about 170 to 225° C., with the optimum range being from about 175 to 200° C. Therefore it is a preferred practice to conduct the polymerization at temperatures somewhat below the point at which the glycols, thioethers or polysulfides will commence distilling; however if higher temperatures are employed, the apparatus may be arranged so as to return the distilled glycols to or near the polymerization zone.

When the polymerization is carried out by disposing all of the reactants in a vessel and heating with continuous or intermittent distillation of water, the reaction time required to obtain products having molecular weights of about 200 or more is at least about 10 hours, and usually is about 24 hours or even longer. Under a given set of conditions the molecular weight of the polymer varies directly with the amount of water formed. Consequently, the average molecular weight of the polymeric product can be readily calculated by the amount of water which has been distilled out of the polymerization zone.

Following the polymerization period, the product usually is purified. The first step in purification is the removal of the catalyst. If this is a solid, suspended in the liquid polymer or a solution of the polymer, a simple filtration is all that is required. When the catalyst is in solution other means must be employed. For example, when sulfonic acids are the catalysts used, a preferred method for their removal from the polymer comprises dissolving or thinning the polymer with an organic solvent such as benzene, washing with concentrated caustic to convert the acid to the sodium salt, and subsequently extracting with water to remove the sodium salts of the acids and any remaining traces of caustic.

After removal of the catalyst, the product may be dehydrated in order to remove the last traces of water formed during polymerization and any water remaining from catalyst extraction operations. Water may be removed by the use of dehydrating agents, or by distillation, preferably under diminished pressure. If this latter method is employed, any solvents present and any monomers may be removed at the same time. Consequently, at the end of these operations there remains the copolymers free from solvents, water and catalyst.

One phenomenon peculiar to the present copolymerization is the production of color bodies which lower the quality of the product for some purposes. These color bodies are not soluble in the ordinary extraction media, such as organic solvents and hydrocarbon fractions. Furthermore, the removal of the color by means known to the art fails, when the commonly known oxidizing agents, such as permanganate, peroxide, etc. are employed. Other ordinary bleaching procedures heretofore utilized fail to improve the color of the copolymers, such as treatment with various activated carbons, activated aluminas, silica gels, or extraction with steam or toluene. All of these methods and agents readily decolorize glycerine, for example, but since they fail to improve the color of the subject copolymers it is assumed that the color bodies are of a character not encountered heretofore.

However, in accordance with one phase of this invention, it has been found that a major portion of the color bodies may be removed by a combination treatment, comprising initially percolating the dehydrated polymer through fuller's earth, and subsequently subjecting it to hydrogenation. By this combination treatment polymers of the copolymers useful in the present lubricants are obtained having a light yellow color, as compared with the dark brown or black masses initially obtained by the polymerization described.

Percolation through fuller's earth is preferably carried out in an inert solvent, suitably a hydrocarbon such as benzene, toluene, xylene, etc. The percolation is preferably carried out at room temperature or below, but may be conducted at elevated temperatures, as long as the temperature and pressure adjustments are such as to prevent boiling of the solvent and consequent deposition of the polymer in the percolation tower. The percolation treatment results in the production of polymers having improved colors satisfactory for many purposes, in which case all that remains to be done is to flash off the solvent in order to recover the polymer.

On the other hand, copolymers having the least color can be obtained only by following the percolation with hydrogenation. Neither percolation alone, nor hydrogenation alone, nor any of the ordinary decolorizing or bleaching procedures results in the formation of light colored polymeric lubricants such as those obtained by treatment with fuller's earth followed by hydrogenation.

In carrying out the percolation through fuller's earth, oxygen-containing solvents such as acetone, methyl alcohol and dioxane are relatively ineffective for aiding in the removal of color from the subject polymers. The color removal appears to be specific in that hydrocarbon solvents, and especially aromatic hydrocarbon solvents are required, benzene and toluene giving the best results.

The hydrogenation step is essential for the reduction of color-sensitive functional groups, supposedly carbonylic in character. Raney nickel, nickel sulfide, copper, palladium, platinum and other catalysts suitable for the reduction of carbonyls may be used, although Raney nickel is preferred. Temperatures employed vary from about 50 to about 275° C., and hydrogen pressures from about 500 to about 3000 lb. per square inch are utilized. Subsequent to hydrogenation, the catalyst may be removed from the product e. g. by super-centrifuging or filtration, and any solvents present may be flashed off to yield the light yellow copolymer.

The copolymers formed as described hereinbefore have hydroxyl groups on one or both ends of each polymer chain. These hydroxyls may be acted upon with such materials as etherifying or esterifying agents in order to obtain products having altered properties, such as solubility or improved action as lubricants, plasticizers, etc.

Various etherifying agents may be used for etherifying terminal hydroxyls. These include alkyl halides, such as methyl iodide, methyl bromide, ethyl chloride, propyl iodide; aralkyl halides such as benzyl chloride and methylbenzyl chloride; hydroxyalkyl chlorides such as hydroxyethyl chloride; carboxyalkylating agents such as sodium monochloracetate; and alkylene halides such as allyl chloride. Ordinarily, the etherification is carried out in strongly basic environments; sodium hydroxide, liquid ammonia and quaternary ammonium bases and salts being the usual basic substances present.

Esterification of the terminal hydroxyls may be accomplished with various inorganic groups such as nitrates, phosphates or sulfates. However, preferred esterifying agents are the organic acid anhydrides or acid chlorides, and especially fatty acid anhydrides and their chlorides, including for example formic, acetic, propionic, butyric, hexoic, 2-ethylhexoic, and higher fatty acids such as lauric, stearic, myristic, palmitic and capric acids. Usually, the esters are formed by treatment of the hydroxylated polymer with the anhydride of the acid in the presence of a catalyst such as sulfuric or phosphoric acid. The saturated fatty acids form the most stable esters with the polymeric lubricants.

At times it is preferable to allow only partial etherification or esterification thus forming half-ethers or half-esters instead of the di-ethers or di-esters theoretically possible. For other purposes the end-group hydroxyls may not only be partially or completely esterified, but also may be treated so as to result in the formation of mixed ethers, mixed esters or ether-esters.

Etherification or esterification of the end-groups may take place simultaneously with or subsequent to polymerization, and may be effected prior to or subsequent to the decolorizing and purifying processes described hereinbefore. Preferably, the end-group modification is carried out immediately after polymerization and before purification or decolorizing, but a secondary preferred time for modification is during the polymerization step itself.

When carrying out this latter step, the exact mechanism by which substitution of the end-groups occurs is obscure. However, it has been discovered, in accordance with this invention, that by using an active modifying agent such as an alcohol as the diluent during the polymerization, reaction occurs to give polymers having at least one substituted end group, such as an ether group or ester group. For example, if alcohols such as n-octyl alcohol, n-decyl alcohol, n-dodecyl alcohol, etc., or their isomers, are used as diluents during the polymerization the corresponding ethers of the polymers are formed. This provides a convenient method for modifying the properties of the polymer. It is preferred that the alcoholic diluent, or other modifying agent, have from 6 to 20 carbon atoms. The reactive diluent may be the only diluent present, or may be mixed with one or more inert diluents.

The copolymers of the present invention have units of the general configuration

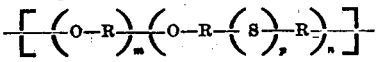

wherein $m$, $n$ and $p$ are integers and the R's are organic radicals, preferably saturated aliphatic hydrocarbon radicals. The polymer chains terminate with hydroxyls, sulfhydryls, alkyl groups, acyl radicals, etc., dependent upon the end group modification effected during or after polymerization.

The copolymers having the greatest utility for lubricating purposes are those, in which the weight ratio of $(O-R)$ groups to $(O-R(S)_p R)$ group is from about 10 to 1 to about 1 to 10, since copolymers within these ratio limits have unexpectedly desirable properties not possessed by homopolymers of either monomer. Furthermore the most suitable copolymers are those in which the R of the group $(O-R)$ is an alkyl having from 1 to 9 carbon atoms, and especially those in which R is a straight hydrocarbon chain having two of less substituents other than hydrogens.

The copolymers most suitable for lubricating purposes are those in which the group

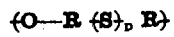

has R's which are identical saturated hydrocarbon units having from 1 to 10 carbon atoms, and in which $p$ is an integer from 1 to 6. Summarizing, the preferred polymers have units of the following configuration

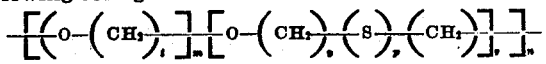

in which $m$ and $n$ are integers from 1 to 10, $t$ is an integer from 1 to 9, $v$ is an integer from 1 to 10, and $p$ is an integer from 1 to 6.

Copolymers having the above preferred configuration include the copolymers of ethylene glycol and bis (gamma-hydroxypropyl) sulfide, the copolymers of ethylene glycol and bis(beta-hydroxyethyl) sulfide, the copolymers of trimethylene glycol and bis (beta-hydroxyethyl) sulfide, the copolymers of trimethylene glycol and bis(gamma-hydroxypropyl) sulfide, the copolymers of hexamethylene glycol and bis (gamma-hydroxypropyl) sulfide, the copolymers of trimethylene glycol and beta-hydroxyethyl-gamma-hydroxypropyl sulfide, the copolymers of ethylene glycol and bis(beta-hydroxyethyl) disulfide, the copolymers of trimethylene glycol and bis (gamma-hydroxypropyl) disulfide, as well as their homologs, analogs and derivatives.

The products of the present invention vary from thin liquids to viscous oils, and, if the molecular weight is great enough, products which are gels or solids at room temperature are formed. The subject copolymers may be of any molecular weight, dependent at least in part upon the extent to which the intermediate glycollic dehydration is carried. Polymers having molecular weights from about 100 to about 10,000 are readily prepared, but those having molecular weights between about 200 and 1500 are preferred, since they have properties of viscosity and solubility which give them extensive utility as lubricants.

Copolymers having molecular weights below about 200 are generally water sensitive, or at least swell in water. Those having higher molecular weights, above about 200, are soluble in the usual organic solvents, such as aromatic hydrocarbons, esters, ethers and alcohols. The solubility of the polymer varies with (a) molecular weight; (b) identity of the monomer; and (c) end-group modification. If, however, the polymer, and especially those having molecular weights below about 1100, have end-groups of substantial size, such as a n-decyl ether group, the properties such as solubility, etc., may be substantially modified.

When the molecular weight is less than about 1500, the polymers have freezing points varying from about —5° C. to lower than —75° C. Again, this property varies with the three factors given in the paragraph above. For example a copolymer of 80 parts trimethylene glycol and 20 parts bis(gamma-hydroxypropyl) sulfide has a freezing point of about —5° C., while a copolymer (having similar molecular weight) of 80 parts trimethylene glycol and 20 parts beta-hydroxyethyl-gamma-hydroxypropyl sulfide has a freezing point lower than —75° C.

The polymers have viscosity characteristics which make them useful as lubricants. Polymers having molecular weights between about 350 and about 800 have viscosities from about 45 to about 300 centistokes at 100° F., and from about 7.5 to about 45 centistokes at 210° F. These viscosities correspond to lubricating oils having S. A. E. numbers from about 10 to about 80.

Another important viscosity characteristic possessed by the copolymers is their excellent viscosity indices. Dependent upon the three variables of molecular weight, monomer identity, and end-group modification, the viscosity index may be varied from about 110 to 165 or even higher. Accordingly, while a copolymer of 90 parts trimethylene glycol and 10 parts bis(beta-hydroxyethyl) sulfide has a viscosity index of 110, a copolymer of 80 parts trimethylene glycol and 20 parts bis (beta-hydroxyethyl) sulfide has a viscosity index of 153.

The oxidation resistance of the copolymers of this invention is outstanding, especially in the presence of certain anti-oxidants. This phenomenon is not common to all polymers having ether linkages. For example polymers of propylene oxide, containing 0.5% phenyl-alpha-napthylamine, required only 16.5 hours for a 10 lb. oxygen pressure drop and 17.8 hours for a 20 lb. drop, when tested by the standard copper catalyst oxygen bomb stability test used for petroleum products. In comparison, under the same conditions, a copolymer of 80 parts trimethylene glycol and 20 parts bis (beta-hydroxyethyl) sulfide inhibited with 0.5% phenyl-alpha-naphthylamine required 59 hours for a 10 lb. oxygen pressure drop, and had not lost 20 lb. oxygen pressure at the end of 112 hours.

The copolymers described herein are especially responsive to two principal classes of oxidation inhibitors, namely substituted phenols and substituted aromatic amines. Other amines imparting outstanding stability to the copolymers include the n-alkylated para-phenylenediamines and the polynuclear aromatic amines, such as n - butyl-para-phenylenediamine, n,n'-dibutyl para-phenylenediamine, alpha- and beta-naphthylamine, phenyl-beta-naphthylamine, alpha, alpha-, beta, beta-, or alpha, beta-dinaphthylamine, etc. From about 0.05 to about 8 (by weight) amine gives copolymeric lubricants having outstanding stability toward oxidation. The optimum inhibitor concentration is from about 0.5% to about 5.

The freezing points of the copolymers of the present invention are much lower than those of polymers of either monomer from which the copolymers are prepared. This unexpected and surprising property makes the copolymers especially suitable for use as lubricants where low temperatures are expected. For example, trimethylene glycol polymers solidify at about 2 to 10° C., and polymers of bis(beta-hydroxyethyl) sulfide are solids at 28° C. or below. In spite of this, copolymers of trimethylene glycol and bis(beta-hydroxyethyl) sulfide have freezing points even lower than −75° C.

The copolymers not only have very low freezing points, but also have excellent thermal stability, not volatilizing appreciably below about 250° C. The present copolymers may be compounded with various organic acidic materials which form water insoluble metallic soaps to give corrosion-protective lubricants. They may be gelled with soaps to give grease compositions. The combination of methacrylate polymers and the subject copolymers produced lubricating compositions of high viscosity and high viscosity index. The addition of certain chlorine, sulfur or phosphorus compounds thereto results in the production of extreme pressure lubricants.

Having described the general characteristics, preparation, properties and uses of the copolymers of this invention, examples are presented illustrating specific embodiments thereof, especially the copolymerization process and the copolymers so formed:

Example 1
*Copolymerization of trimethylene glycol and bis(beta-hydroxyethyl) sulfide*

Eight hundred parts trimethylene glycol and 200 parts bis (beta-hydroxyethyl) sulfide were heated in the presence of 40 parts para-toluene sulfonic acid for 12 hours within the temperature range 170°–200° C. The polymerization was carried out in a reaction kettle fitted with a still head allowing water to distill out continuously. The product was dissolved in benzene, washed with 48 Bé. caustic and with water, and then was decolorized by percolation through fuller's earth. Solvents were removed by distillation, and the product was dehydrated by heating at 100° C. under 3 mm. Hg pressure.

A similar polymerization, using the same ratio of reactants was carried out, the only difference being that the polymerization was continued for a total of 18 hours in order to obtain a higher molecular weight product than that from the first polymerization.

A third polymerization was effected, using a ratio of 900 parts trimethylene glycol to 100 parts bis(beta-hydroxyethyl) sulfide. The properties of three polymers are given in Table 1, below:

TABLE 1
*Copolymers of trimethylene glycol and bis(beta-hydroxyethyl) sulfide*

| | | | |
|---|---|---|---|
| Parts trimethylene glycol | 800 | 800 | 900 |
| Parts bis(beta-hydroxyethyl) sulfide | 200 | 200 | 100 |
| Molecular weight | 386 | 605 | 527 |
| Centistokes viscosity, 100° F | 41.6 | 151.0 | 53.6 |
| Centistokes viscosity, 210° F | 8.86 | 21.47 | 7.46 |
| Viscosity index | 153 | 136 | 110 |
| Freezing point, ° C | Less than −75 | Less than −75 | |
| Gardner color | 12 | | 10 |

EXAMPLE 2
*Copolymerization of trimethylene glycol and bis(beta-hydroxyethyl) sulfide*

Six hundred parts trimethylene glycol, 40 parts bis-(beta-hydroxyethyl) sulfide and 80 parts hydrogen iodide (50% aqueous solution) were polymerized as described in Example 1. The polymer was isolated as described above, the product having a molecular weight of 545; centistokes viscosity at 100° F., 123.8; centistokes viscosity at 210° F., 13.29; viscosity index, 136 and a freezing point lower than −75° C.

EXAMPLE 3
*Copolymerization of trimethylene glycol and bis-(gamma-hydroxypropyl) sulfide*

Nine hundred parts trimethylene glycol, 100 parts bis(gamma-hydroxypropyl) sulfide and 40 parts para-toluene sulfonic acid were heated for 15 hours in the temperature range 160°–200° C., using the apparatus and purification procedure described in Example 1.

A second polymerization was carried out as above, using a ratio of 800 parts trimethylene glycol to 200 parts bis(gamma-hydroxypropyl) sulfide. The properties of the polymers are given in Table 2, below:

TABLE 2

| | | |
|---|---|---|
| Parts trimethylene glycol | 900 | 800 |
| Parts bis(gamma-hydroxypropyl) sulfide | 100 | 200 |
| Molecular weight | 782 | 857 |
| Centistokes viscosity, 100° F | 178.4 | 287.2 |
| Centistokes viscosity, 210° F | 24.51 | 44.53 |
| Viscosity index | 135 | 136 |
| Freezing point, ° C | −5 | −10 |
| Gardner color | 10 | 9 |

*Copolymerization of trimethylene glycol and beta-hydroxyethyl-gamma-hydroxypropyl sulfide*

Eight hundred parts glycol, 200 parts beta-hydroxyethyl-gamma-hydroxypropyl sulfide and 40 parts para-toluene sulfonic acid were treated as described in Example 1, the polymerization mixture being heated 14 hours at 170°–200° C. The product had a molecular weight of 635; viscosity at 100° F., 61.4 centistokes; viscosity at 210° F., 11.08 centistokes; viscosity index, 146; and a freezing point lower than −75° C.

We claim as our invention:

1. The process which comprises heating an alkylene glycol with a bis(hydroxyethyl) sulfide in a weight ratio of glycol:sulfide from 4:1 to 15:1 at a temperature between 150° and 300° C. in the presence of a dehydration catalyst, whereby a mixture of copolymers of the oxide and sulfide is formed.

2. The process which comprises heating trimethylene glycol and bis(beta-hydroxyethyl) sulfide in a weight ratio of glycol:sulfide from 4:1 to 15:1 at a temperature between 170° C. and 200° C. in the presence of para-toluene sulfonic acid, whereby a mixture of copolymers of the glycol and the sulfide is formed, said mixture having an average molecular weight from about 380 to about 550.

3. The process which comprises heating an alkylene glycol with a di(hydroxyalkyl) sulfide in a weight ratio of glycol:sulfide from 4:1 to 15:1 at a temperature between 150° and 300° C. in the presence of a dehydration catalyst, whereby a mixture of copolymers of the oxide and sulfide is formed.

4. The process which comprises heating trimethylene glycol and bis(gamma - hydroxypropyl) sulfide in a weight ratio of glycol:sulfide from 4:1 to 9:1 at a temperature between 160°

C. and 200° C. in the presence of para-toluene sulfonic acid, whereby a mixture of copolymers of the glycol and the sulfide is formed, said mixture having an average molecular weight from about 782 to about 857.

5. The process which comprises heating trimethylene glycol and beta-hydroxyethyl-gamma-hydroxypropyl sulfide in a weight ratio of glycol:sulfide of about 4:1 at a temperature between 170° C. and 200° C. in the presence of para-toluene sulfonic acid, whereby a mixture of copolymers of the glycol and the sulfide is formed, said mixture having an average molecular weight of about 635.

6. The process which comprises heating an alkylene glycol with a di(hydroxyalkyl) sulfide in a weight ratio of glycol:sulfide from 4:1 to 15:1 at a temperature between 150° and 300° C. in the presence of para-toluene sulfonic acid, whereby a mixture of copolymers of the oxide and sulfide is formed.

7. The process which comprises heating an alkylene glycol with a di(hydroxyalkyl) sulfide in a weight ratio of glycol:sulfide from 4:1 to 15:1 at a temperature between 170 to 225° C. in the presence of a dehydration catalyst, whereby a mixture of copolymers of the oxide and sulfide is formed.

8. The process which comprises heating an alkylene glycol with a di(hydroxyalkyl) sulfide in a weight ratio of glycol:sulfide from 4:1 to 15:1 at a temperature between 150° and 300° C. in the presence of an aromatic sulfonic acid, whereby a mixture of copolymers of the oxide and sulfide is formed.

9. The process which comprises heating an alkylene glycol with a di(hydroxyalkyl) sulfide in a weight ratio of glycol:sulfide from 4:1 to 15:1 at a temperature between 150° and 300° C. in the presence of a hydrohalide acid, whereby a mixture of copolymers of the oxide and sulfide is formed.

10. The process which comprises heating an alkylene glycol with a di(hydroxyalkyl) sulfide in a weight ratio of glycol:sulfide from 4:1 to 15:1 at a temperature between 150° and 300° C. in the presence of an organic dehydration catalyst, whereby a mixture of copolymers of the oxide and sulfide is formed.

11. The process which comprises heating an alkylene glycol with a di(hydroxyalkyl) sulfide in a weight ratio of glycol:sulfide from 4:1 to 15:1 at a temperature between 150° and 300° C. in the presence of an inorganic dehydration catalyst, whereby a mixture of copolymers of the oxide and sulfide is formed.

12. The process which comprises heating an alkylene glycol, the hydroxyl radicals of said glycol being separated by 2–20 carbon atoms, with a di(hydroxyalkyl) sulfide in a weight ratio of glycol:sulfide from 4:1 to 15:1 at a temperature between 150° and 300° C. in the presence of a dehydration catalyst, whereby a mixture of copolymers of the oxide and sulfide is formed.

13. The process which comprises heating an alkylene glycol with a di(hydroxyalkyl) sulfide, the alkyl radicals of said sulfide having from 2–6 carbon atoms each, in a weight ratio of glycol:sulfide from 4:1 to 15:1 at a temperature between 150° and 300° C. in the presence of a dehydration catalyst, whereby a mixture of copolymers of the oxide and sulfide is formed.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 2,111,260 | Brunner | Mar. 15, 1938 |
| 2,129,709 | Schuette | Sept. 13, 1938 |
| 2,220,941 | Moran | Nov. 12, 1940 |
| 2,332,869 | Okita | Oct. 26, 1943 |
| 2,383,916 | Morgan | Aug. 28, 1945 |

FOREIGN PATENTS

| Number | Country | Date |
|---|---|---|
| 327,722 | Great Britain | Sept. 10, 1930 |

Certificate of Correction

Patent No. 2,518,245      August 8, 1950

RUPERT C. MORRIS ET AL.

It is hereby certified that error appears in the printed specification of the above numbered patent requiring correction as follows:

Column 14, line 50, for "bis(hydroxyethyl)" read *bis(hydroxyalkyl)*;

and that the said Letters Patent should be read as corrected above, so that the same may conform to the record of the case in the Patent Office.

Signed and sealed this 23rd day of January, A. D. 1951.

[SEAL]

THOMAS F. MURPHY,
*Assistant Commissioner of Patents.*